US005590010A

United States Patent [19]

Ceola et al.

[11] Patent Number: 5,590,010

[45] Date of Patent: Dec. 31, 1996

[54] HEAT RESPONSIVE POWER INTERRUPTING DEVICE

[76] Inventors: Giacomo Ceola, Via Pastro 61/G, Villorba, Treviso, Italy; James K. McCusker, 12 Post La., Suffern, N.Y. 10901; Giacomo Calzavara, 128 Surrey Ct., Ramsey, N.J. 07446

[21] Appl. No.: 274,097

[22] Filed: Jul. 12, 1994

[51] Int. Cl.[6] .................................................... H02H 5/04

[52] U.S. Cl. .............................. 361/93; 361/34; 361/105; 361/106; 337/13; 337/35

[58] Field of Search .................................... 337/1–13, 35, 337/36; 361/34, 93, 103, 105, 106

[56] References Cited

U.S. PATENT DOCUMENTS 1,732,295 10/1929 Aichele .
1,741,601 12/1929 Appelberg .
1,859,125 5/1932 Bethenod .
2,005,549 6/1935 Klahn .
2,207,160 7/1940 Rivers .
2,399,406 4/1946 Toth .
2,563,066 8/1951 Procopio .
2,913,552 11/1959 Roberts .
3,386,004 5/1968 Dwyer .
3,681,730 8/1972 Fortino .
3,798,582 3/1974 Schwartz .
3,872,355 3/1975 Klein et al. ............................ 317/18
4,306,210 12/1981 Saur ............................................ 337/2
4,369,364 1/1983 Kuntermann .
4,493,975 1/1985 Yamamoto .
4,523,248 6/1985 Schmale et al. .
4,659,909 4/1987 Knutson .
4,687,906 8/1987 Fujishima et al. .
4,808,965 2/1989 Cenky .................................... 337/408
4,822,290 4/1989 Cauley et al. .
4,959,025 9/1990 Eberhard et al. .
5,023,744 6/1991 Hofsäss .................................... 361/26
5,113,045 5/1992 Crofton .
5,138,185 8/1992 Weinstock .
5,161,892 11/1992 Shigezawa et al. .
5,261,825 11/1993 Chaves .
5,266,039 11/1993 Boyer et al. .
5,269,695 12/1993 Opel .
5,269,697 12/1993 Essex .
5,320,545 6/1994 Brothers .

*Primary Examiner*—Jeffrey A. Gaffin
*Assistant Examiner*—Michael Sherry

[57] ABSTRACT

An electric device is provided as an interface between a permanent power source (e.g., an electric wall outlet) and an electrical appliance for interrupting electrical power to the appliance in the event the temperature of either the power cord plug of the electrical appliance or permanent power source rises above a predetermined temperature. The electric device detachably couples to the electric power terminals of both the permanent power source and electrical appliance and is sensitive to the temperature of the aforementioned terminals. The electric device includes first and second temperature switching elements which are responsive to interrupt electrical power from the permanent power source to the appliance when either of the terminals is of a temperature which equates with a first predetermined temperature determined by the first temperature switching element or a second predetermined temperature determined by the second temperature switching element.

17 Claims, 3 Drawing Sheets

Fig. 1
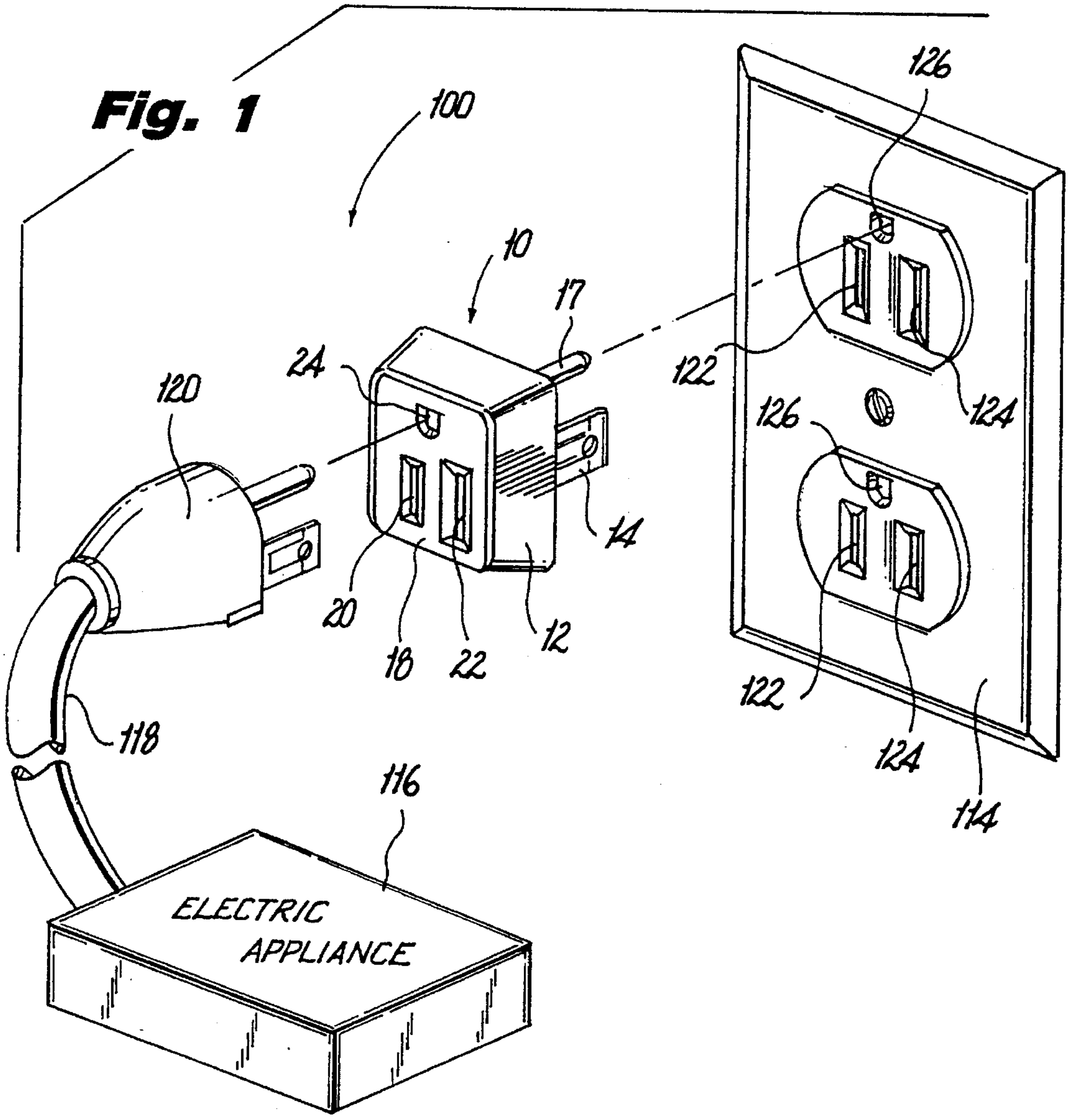
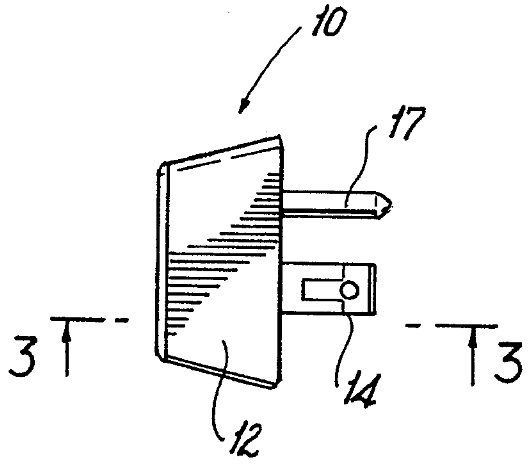
Fig. 2

Fig. 3
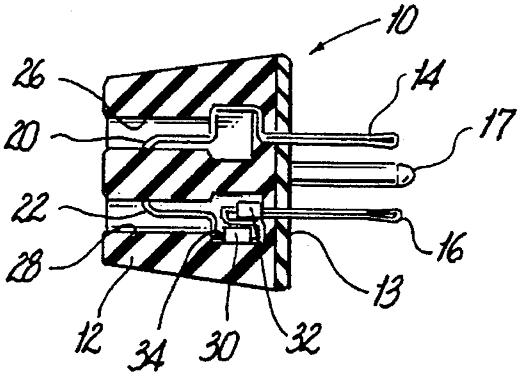
Fig. 4
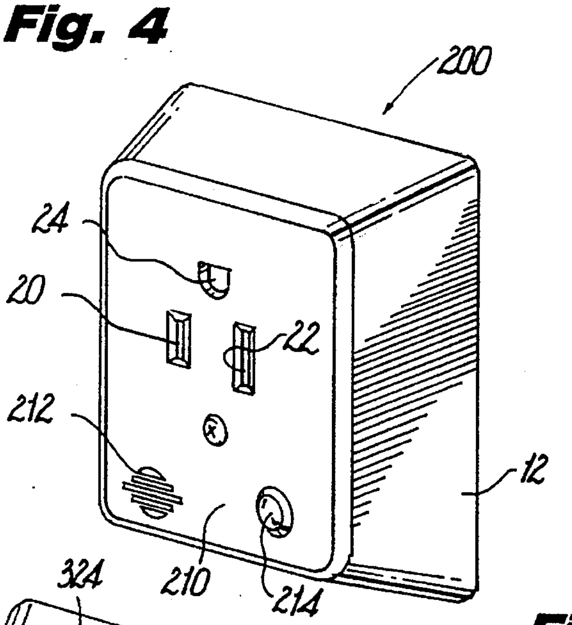
Fig. 5
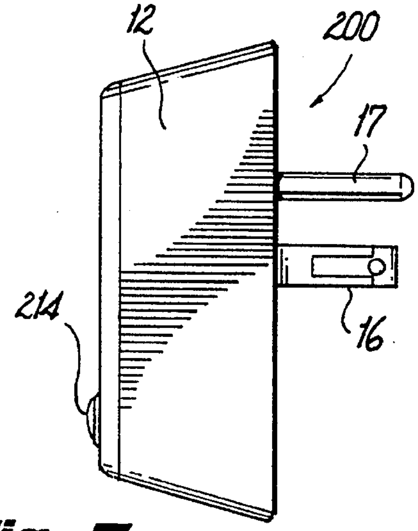
Fig. 7
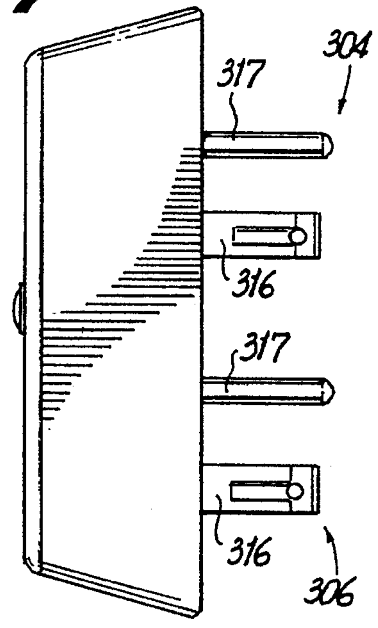
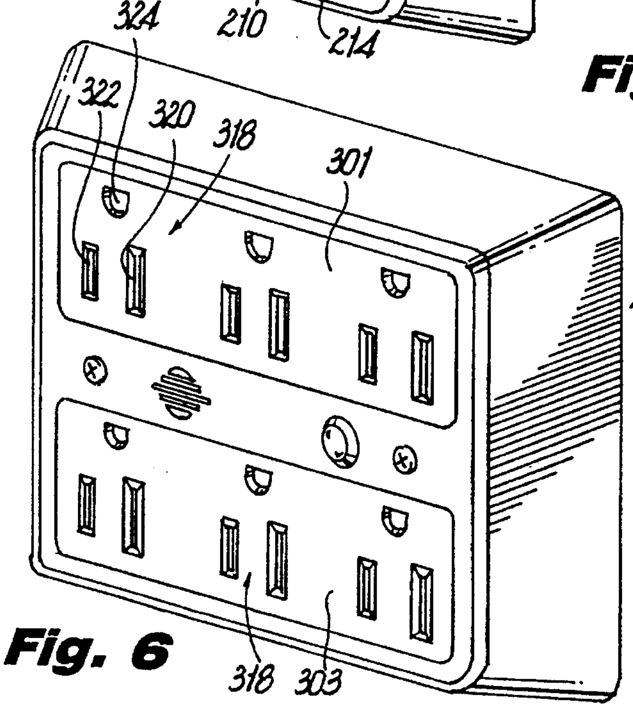
Fig. 6

HEAT RESPONSIVE POWER INTERRUPTING DEVICE

BACKGROUND OF THE INVENTION

1. Field of the Invention

The present invention relates generally to a device for interrupting electrical power to an electric appliance in response to an increase in temperature. More particularly, it relates to a device which is an electrical interface between a permanent power source and an electric appliance and is constructed to interrupt electrical power from a conventional wall outlet to the appliance in the event that the temperature of either the appliance plug and/or the wall outlet receptacle reaches a predetermined temperature.

2. Discussion of the Prior Art

Devices which interrupt electric power to an electric appliance are well known in the art. Typically, such devices are essentially circuit brokers or fuses which interrupt electrical power in the event that an electric current of a value greater than a predetermined threshold amount is delivered to the appliance. A large electrical current value relative to the requirements of a particular appliance can cause damage to the components of the appliance and may potentially create a hazardous condition. Thus, these devices typically have addressed the need to interrupt electrical power in response to a relatively large electric current flow to an appliance.

However, such a typical fuse or circuit breaker is only responsive to electrical current and is unresponsive to the temperature condition of either the wall outlet and/or the electric appliance, specifically at the power cord plug. It has been found that an old or defective wall outlet can deteriorate to a condition which may cause the wiring of the wall outlet to reach abnormally high temperatures even with a nominal electric current flow therethrough. Such high temperatures in the wiring of the wall outlet can cause arcing to occur and/or create a potential hazardous condition.

Further, a faulty appliance or an appliance which remains energized for a prolonged period of time may equally create a hazardous condition. For example, appliances such as humidifiers, dehumidifiers, air cleaners, air conditioners, and electric heaters commonly remain plugged into a wall outlet for prolonged periods of time. In houses or buildings where the wiring is old, and as such the wiring may have deteriorated over such a period due to the heat which is generated by the appliance, the deteriorated wiring within the above mentioned wall outlet, may reach abnormally high temperatures even with a nominal electric current flow therethrough creating a potentially dangerous condition.

In addition, in old or worn outlets, the plug receptacles may deteriorate to a point where the male prongs of the appliance plug may fit loosely into the female receptacles of the outlet. In appliances such as those listed above, which draw a relatively high startup current, as the appliance cycles on and off during normal use there may be some arcing at the receptacles. Arcing causes heat, and in extreme situations the male prongs may in fact melt to a point of fusing within the receptacle. As the heat increases, the potential for a hazardous condition likewise increases.

As noted above, the typical fuse or circuit breaker is only responsive to interrupt electric power to an appliance in the event of relatively high current flow therethrough. In the event of nominal current flow therethrough, the typical fuse or circuit breaker is unable to interrupt electrical power and may consequently be unable to avoid the aforementioned hazard condition due to the overheating problem.

Thus, it is an object of the present invention to provide a device which interrupts electric power to an electric appliance when either the temperature of the wall outlet and/or appliance reaches a predetermined temperature.

SUMMARY OF THE INVENTION

The present invention relates generally to an electrical device operative to interrupt electrical power to an electric appliance when the wiring terminal temperature of either the wall socket and/or the power supply cord plug of the appliance exceeds a threshold temperature. In particular, it relates to a device which is an electrical interface between a permanent power source and an electric appliance and is adapted to interrupt electric power from the power source to the appliance when the wiring terminal temperature of either the power source outlet or electric appliance power cord plug exceeds a preset temperature to avoid a potentially hazardous condition.

The electrical device of the present invention includes at least one pair of input terminals, similar to the male prongs of a power supply cord plug, adapted for releasable engagement to a source of electrical power, such as a conventional wall socket providing alternating current power. The electrical device further includes at least one pair of output terminals, similar to the female receptacles of a wall socket, adapted for releasable engagement to input terminals associated with the appliance, such as the conventional plug.

A temperature sensitive circuit is provided in the electrical device of the present invention and is mounted in electrical communication between the pair of input terminals and output terminals. The temperature sensitive circuit includes preferably a positive temperature coefficient resistor (more commonly known as a PTC or thermistor) coupled to at least one terminal of each of the pairs of input and output terminals and is operative to interrupt electrical power to the pair of output terminals when the temperature of either one of the input and output terminals equates with a first predetermined temperature, wherein the temperature. of the input and output terminal respectively correlates to the temperature of the wall socket and the wiring terminal temperature of the appliance. The temperature sensitive circuit also preferably includes a bimetallic thermostat coupled to the positive temperature coefficient resistor and is operative to interrupt electrical power to the pair of output terminals when either one of the input and output terminals equates with a second predetermined temperature.

Thus, when the wiring terminal temperature of either the wall socket and/or appliance plug reaches a predetermined temperature, the temperature sensitive circuit is operative to interrupt electrical power to the appliance so as to avoid a potentially fire hazardous condition. The temperature sensitive circuit is operative to only restore electrical power to the appliance, via its output terminals when the wiring terminal temperature of both the wall socket and appliance plug are below the aforementioned predetermined temperature. A manual reset button may be provided, or alternatively, the device may require the user to unplug the device to permit a cooling off period to reset the circuit.

In another preferred embodiment of the electric device of the present invention, alarm means may be provided in the temperature sensitive circuit and is operative to indicate when the electrical device is interrupting electrical power to the attached electric appliance. The alarm means may include a light indicator and/or an audio indicator.

BRIEF DESCRIPTION OF THE DRAWINGS

Further features of the electrical device of the present invention will become more readily apparent from the following detailed description of the invention taken in conjunction with the accompanying drawings, in which:

FIG. 1 is a diagrammatic illustration of the electrical power interrupting device in accordance with the present invention shown in an intended environment;

FIG. 2 is a side elevational view of the device illustrated in FIG. 1;

FIG. 3 is a cross-sectional view of the device taken along lines 3—3 as illustrated in FIG. 2;

FIG. 4 is a perspective view of another embodiment of the electrical power interrupting device in accordance with the present invention having indicator means incorporated therein;

FIG. 5 is a side elevational view of the device illustrated in FIG. 4;

FIG. 6 is a perspective view of yet another embodiment of the electrical power interrupting device in accordance with the present invention having indicator means and a plurality of input terminals;

FIG. 7 is a side elevational view of the device illustrated in FIG. 6.

DETAILED DESCRIPTION OF THE PREFERRED EMBODIMENT

Figure 8:
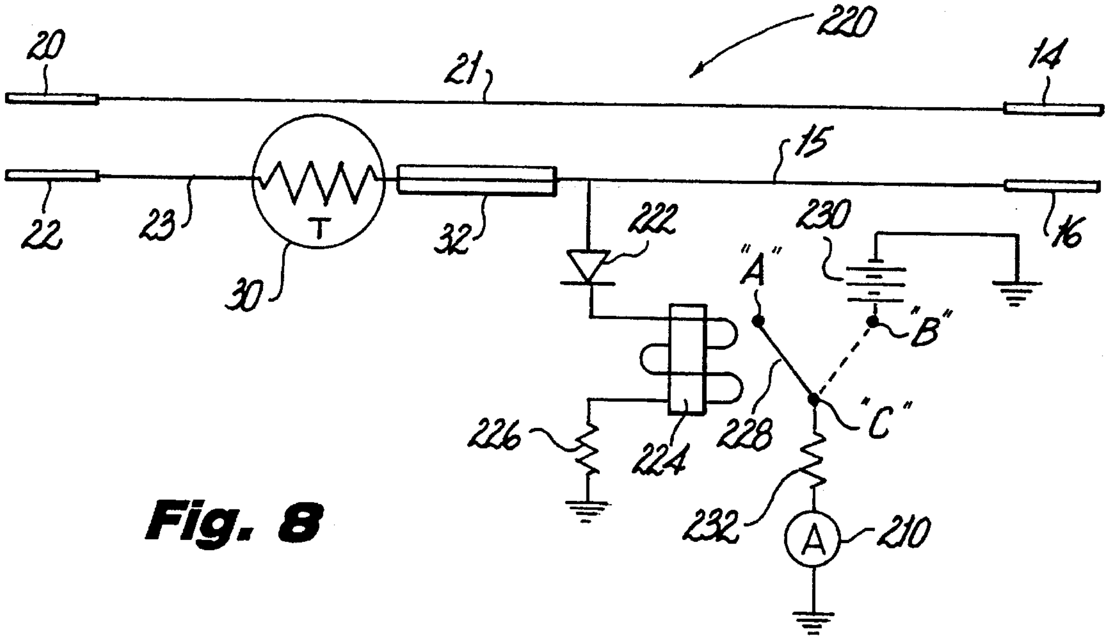
FIG. 8 is a schematic diagram of the circuit within the electrical device illustrated in FIG. 4.

Turning now to the drawings, in which like reference numerals identify similar or identical elements, FIG. 1 illustrates the environment 100 within which the electrical device of the present invention, designated generally by reference numeral 10, is intended for use. Environment 100 includes a conventional electrical receptacle or socket 114 providing a source of electrical power, typically the socket 114 supplies alternating current (AC) to any device in electrical communication therewith. Environment 100 further includes the electrical device 10 and an electrical appliance 116 having an electrical power supply cord 118 that terminates in a conventional plug 120.

Referring now to FIGS. 1 and 2, the electrical device 10 includes an outer housing 12 preferably formed of a non-conductive thermally insulating plastic or a strong thermosetting plastic. A pair of electrical prongs 14, 16 and a ground prong 17 extend outwardly from the housing 12 and are adapted to releasably engage the input terminals 122, 124 and ground terminal 126 of the wall socket 114. The electrical device 10 further provides a socket portion 18 having a pair of electrical input terminals 20, 22 along a ground input terminal 24 adapted to releasably accept and electrically communicate with the plug body member 120 of the appliance 116. As will be described hereinbelow, the electrical device 10 includes circuitry intermediate the prongs 14, 16 and the input terminals 20, 22 which is operative to interrupt electrical power from the wall socket 114 (to which the device 10 is plugged into) to the appliance 116 connected to the device 10 in the event that either of the temperatures within the wall socket 114 and/or plug body 120 rise above a predetermined temperature. It is noted that preferably power will not be restored to the appliance 116 until the temperature of both the wall socket 114 and plug body 120 decrease to a value below the aforementioned predetermined temperature.

Turning to FIG. 3, each prong 14, 16 consists of a electrical conductor extending outwardly from the outer housing 12 adapted to releasably engage respectively in the input terminals 122, 124 of the wall socket 114 (FIG. 1). The outer housing 12 further defines a pair of input ports 26, 28 wherein the input terminals 20, 22 are respectively mounted. Each respective input terminal 20, 22 consists of an electrical conductor, with input terminal 20 consisting of the same unitary electrical conductor which forms prong 14. Thus, input terminal 20 is in constant electrical communication with prong 14. Intermediate input terminal 22 and prong 16 is provided a positive temperature coefficient resistor, commonly known as a PTC or thermistor 30. Coupled to the thermistor 30 is a bimetallic thermostat 32, which may be automatically resettable, upon cooling down, or may be a manually resettable thermostat, having a reset button as is known. The thermistor 30 and bimetallic thermostat 32 are preferably mounted in a cutout portion 34 defined in the housing 12 in a region intermediate the input port 28 and the end wall 13 of the housing 12. Thermistor 30 has an electrical resistance which is exponentially related to changes in temperature, whereby the resistance exponentially increases with temperature. Bimetallic thermostat 32 is an electrical component containing a bimetallic strip which expands or contracts with temperature changes.

The thermistor 30 is coupled to the input terminal 22, while the bimetallic thermostat 32 is coupled to the prong 16 with the thermistor 30 and bimetallic thermostat 32 being coupled to one another. It is appreciated that the thermistor 30 and thermostat 32 are in equal thermal contact with the input terminal 22 and prong 16 of the electrical power interrupting device 10. Thus, via prong 16, the wiring terminal temperature of the wall socket 114 is communicated to the thermistor 30 and bimetallic thermostat 32, and via input terminal 22, the wiring terminal temperature of the plug body 120 is also equally communicated to the thermistor 30 and bimetallic thermostat 32 via the electric plug 120 and the input terminal 22.

The thermistor 30 is configured to exponentially rise to a resistance which permits only an insufficient amount of electrical current needed to energize the appliance 116 when the ambient temperature of the thermistor 30 reaches a first predetermined temperature, effectively shutting the appliance off. Preferably, the first predetermined temperature is equal to approximately 70° C. As mentioned above, the thermistor 30 obtains its ambient temperature from the wiring terminals. of both the wall socket 114 and the plug body 120. Thus, when the wiring terminal temperature of either the wall socket 114 or plug body 120 exceeds the first predetermined temperature, the resistance of thermistor 30 increases to a value which permits only an insufficient amount of electric current to the appliance 116. Essentially, the thermistor 30 functions as an open circuit when the ambient temperature of the thermistor 30 exceeds 70° C., and functions as a closed circuit when its ambient temperature is below 70° C.

The bimetallic thermostat 32 is configured to have its bimetallic strip (not shown) expand at a second predetermined temperature so as to break the electrical connection across the bimetallic thermostat 32 allowing no electrical current flow from the wall socket 114 to the appliance 116. Preferably, the second predetermined temperature is equal to approximately 75° C. As mentioned above, the bimetallic thermostat 32 obtains its ambient temperature from both the wall socket 114 and the plug body 120. Thus, when the wiring terminal temperature of either the wall socket 114 or plug body 120 exceeds the aforementioned second predetermined temperature, the bimetallic thermostat 32 is effected into an open circuit condition causing deenergization of the appliance 116.

Preferably, the second predetermined temperature of the bimetallic thermostat 32 is to be equal to or greater than the first predetermined temperature of the thermistor 30. This arrangement is advantageous in that the bimetallic thermostat 32 functions as a backup protective circuit to the thermistor 30. For example, if the thermistor 30 becomes defective and/or enters thermal runaway, the thermistor 30 will be unable to function properly and consequently may be unable to interrupt the electric current flow from the wall socket 114 to the appliance 116 when the terminal wiring temperature of either the wall socket 114 or plug body 120 exceeds the first predetermined temperature (70°). In such an event, the hazardous condition in either the wall socket 114 will only increase with the continuous electric current flow therethrough but for the provision of the bimetallic thermostat 32. As mentioned above, the bimetallic thermostat 32 is operative to interrupt the electric current flow from the wall socket 114 when the wiring terminal temperature of either the wall socket 114 or plug body 120 exceeds the second predetermined temperature (75 °). The bimetallic thermostat 32 will only restore the electric current flow from the wall socket 114 when the wiring terminal temperature of both the wall socket 114 and plug body 120 are less then the second predetermined temperature (75°).

It is to be appreciated that the first predetermined temperature of 70° for the thermistor 30, and the second predetermined temperature of 75° for the bimetallic thermostat 32 are for illustrative purposes only and may readily be changed to encompass any values suitable to reduce the likelihood of a hazardous condition in accordance with the user's needs.

Referring now to FIGS. 4 and 5, an electrical device 200 is illustrated in accordance with another preferred embodiment of the present invention. Electrical device 200 is substantially identical to electrical device 10 illustrated in FIG. 1, with the exception that electrical device 200 includes the provision of an indicator or alarm 210 for indicating when the device 200 is operative to interrupt electric current flow from the wall socket 114 (FIG. 1) to the appliance 116. Thus, when alarm 210 is activated, it is indicative that the wiring terminal temperature of either the wall socket 114 and/or plug body 120 is greater than a predetermined temperature and is operating improperly and unsafely. Preferably, the alarm 210 may include either an audio indicator 212 and/or a light indicator 214.

FIG. 8 illustrates an electric circuit schematic 220 for the implementation of the alarm 210 in the electrical power interrupting device 200. As described above, the thermistor 30 and bimetallic thermostat 32 are coupled intermediate the input terminal 22 and prong 16, with an electrical conductor 23 electrically connecting the thermistor 30 to the input terminal 22 and an electrical conductor strip 15 electrically connecting the bimetallic thermostat 32 to prong 16. Further, an electrical conductor 21 electrically connects the input terminal 20 to the prong 14. A diode 222 for preventing the back flow of current from a relay coil 224 is coupled to the electrical conductor strip 15 intermediate the bimetallic thermostat 32 and prong 16. The relay coil 224 is coupled to diode 222 and to a current limiting resistor 226 which is coupled to ground. The relay coil 224 is magnetically associated with a relay switch 228, such that, when electric current flow is effected through relay coil 224, the relay switch 228 is in a first position (connecting terminal "A"), and when no electric current flow is effected through relay coil 224, the relay switch is in a second position (connecting terminal "B"), wherein terminal "B" is connected to a voltage source 230, such as a conventional battery. The common terminal (terminal "C") of the relay switch 228 is connected to a current limiting resistor 232 coupled to the alarm 210. As mentioned above, the alarm 210 may include either an audio indicator 212 (FIG. 4) or a light indicator 214.

In operation, when there is electric current flow from input terminal 22 to prong 16, via thermistor 30 and bimetallic thermostat 32, alternating electric current flow is effected across relay coil 224 correspondingly effecting switch 228 to contact terminal "A". Thus, alarm 210 is deenergized because of the open circuit condition between the common terminal "C" of the switch 228 and terminal "B" connected to voltage source 230. In contrast, when either the thermistor 30 or bimetallic thermostat 32 is operational to interrupt electric current flow from the input terminal 22, as described above, no electric current flow will be effected through relay coil 224, thus relay switch 228 is effected to contact terminal "B". When the relay switch 228 contacts terminal "B", the alarm 210 is energized since the voltage source 230 is coupled to the alarm 210, via switch 228. The alarm 210 will remain energized, indicative of the high wiring terminal temperature of either the wall socket 114 (FIG. 1) and/or plug body 120, so long as the wiring terminal temperature of the latter components remains above an aforementioned predetermined temperature corresponding to the thermistor 30 and bimetallic thermostat 32.

It is to be appreciated that the above illustrated and described circuit scheme for the implementation of the alarm 210 is for illustrative purposes only as it is envisioned numerous circuit schemes may be utilized for the implementation of the alarm 210 so as to accommodate a user's particular needs.

Yet another preferred embodiment of the electrical device in accordance with the present invention is illustrated in FIGS. 6 and 7 and is designated generally with reference numeral 300. Electrical device 300 is substantially similar to electrical device 10 illustrated in FIG. 1 with the exception that electrical device 300 includes a plurality of sockets 318 each having a pair of electrical input terminals 320, 322 along with a ground input terminal 324. In the embodiment illustrated in FIG. 6, there is illustrated two horizontally extending rows 301 and 303 of sockets 318, with each row containing for example three sockets 318. Further, the electrical device 300 includes first and second pairs 304, 306 of electrical prongs 314, 316 with each respective pair preferably including a ground prong 317. The first and second pairs 304, 306 of electrical prongs 314, 316 and the ground prong 317 are preferably arranged in a configuration to simultaneously releasably engage with the two pair of electrical input terminals 20, 22 and ground terminal 24 provided on a dual wall socket 114, as shown in FIG. 1.

The first pair 304 of electrical prongs 314, 316 are electrically connected to the first top row 301 of sockets 318, while the second pair 306 of electrical prongs 314, 316 are electrically connected to the second bottom row 303 of sockets 318. Those having ordinary skill in the art to which the present invention pertains will appreciate that other alternative structural arrangements having a plurality of sockets 318 may be utilized therein. Intermediate the first pair 304 of electrical prongs 314, 316 and the first top row of sockets 318 is a thermistor and bimetallic thermostat as described above which perform the same safety power interrupting function as also described above with respect to the first pair 304 of electrical prongs 314, 316 and top row 301 of sockets 318. Similarly, intermediate the second pair 306 of electrical prongs 314, 316 and the bottom row 303 of sockets 318 is a second thermistor and bimetallic thermostat.

While the invention has been particularly shown and described with reference to the preferred embodiments, it will be understood by those skilled in the art that various modifications in form and detail may be made therein without departing from the scope and spirit of the invention. It is to be appreciated for instance, that the electrical device 10 of the present invention may be incorporated directly into the power circuitry of the power supply cord plug body of an electrical appliance. Accordingly, modifications such as those suggested above, but not limited thereto, are to be considered within the scope of the invention.

What is claimed is:

1. A circuit coupled to an electrical socket for interrupting electrical power to an electric appliance, said circuit comprising:

(a) an input port for receiving electrical power from an electrical socket;

(b) an output port for delivering electrical power to an electric appliance, said outlet port accommodating plug blades of said electrical appliance;

(c) a first resettable switching element coupled to said input and output ports and operative to interrupt electrical power to said electric appliance in response to when either of said electrical socket or said plug blades of said electric appliance attains a first predetermined temperature; and (d) a second resettable switching element coupled to said first resettable switching element and operative to interrupt electrical power to said electric appliance in response to when either of said electrical socket or said plug blades of said electric appliance attains a second predetermined temperature, wherein said second predetermined temperature is greater than said first predetermined temperature.

2. A circuit as recited in claim 1, wherein said first switching element includes a positive temperature coefficient resistor electrically connected to said input and output ports.

3. A circuit as recited in claim 2, wherein said positive temperature coefficient resistor is configured to increase to a resistive value which interrupts electrical power to said electric appliance so as to deactivate said electric appliance when either of said input and output ports attains 70° C.

4. A circuit as recited in claim 2, wherein said second switching element includes a bimetallic thermostat electrically connected to said input and output ports.

5. A circuit as recited in claim 4, wherein said bimetallic thermostat is configured to interrupt electrical power to said electric appliance when either of said input and output ports attains a temperature greater than said second predetermined temperature.

6. A circuit as recited in claim 1, wherein said input port includes at least one pair of plug blades adapted for releasable engagement to said electrical socket.

7. A circuit as recited in claim 6, wherein said output port includes at least one pair of output terminals adapted for releasable engagement with said plug blades of said appliance.

8. A circuit as recited in claim 1, further comprising an alarm circuit for indicating when said circuit interrupts electrical power to said appliance.

9. A circuit as recited in claim 8, wherein said alarm circuit includes an audio indicator.

10. A circuit as recited in claim 8, wherein said alarm circuit includes a light indicator.

11. A device for automatically interrupting electrical power to an electric appliance, said device comprising:

(a) a housing portion;

(b) at least one pair of output terminals adapted for releasable engagement to an electrical outlet;

(c) at least one pair of output terminals adapted for releasable engagement to input terminals associated with an appliance;

(d) a positive temperature coefficient resistor coupled to at least one terminal of either of said input and output terminals and operative to interrupt alternating current power to said pair of output terminals when either of said electrical socket or said input terminals of said electric appliance attains a first predetermined temperature; and e) a resettable bimetallic thermostat coupled to said positive temperature coefficient resistor and at least one terminal of either of said input and output terminals and operative to interrupt alternating current power to said pair of output terminals when either of said electrical socket or said input terminals of said electrical appliance attains a second predetermined temperature, wherein said second predetermined temperature is greater than said first predetermined temperature.

12. A device for automatically interrupting electrical power to an electric appliance as recited in claim 11, wherein said device includes a plurality of pairs of said output terminals.

13. A device for automatically interrupting electrical power to an electric appliance as recited in claim 11, wherein said device includes at least two pairs of said input terminals and at least two pairs of said output terminals.

14. A device for automatically interrupting electrical power to an electric appliance as recited in claim 13, wherein said device includes said positive temperature coefficient resistor and said resettable bimetallic thermostat respectively coupled between each said input and output terminal of each said pair of input and output terminals.

15. A device for automatically interrupting electrical power to an electric appliance as recited in claim 11, further comprising an alarm circuit for indicating when said device is interrupts electrical power to said appliance.

16. A device for automatically interrupting electrical power to an electric appliance as recited in claim 15, wherein said alarm circuit includes an audio indicator.

17. A device for automatically interrupting electrical power to an electric appliance as recited in claim 16, wherein said alarm circuit includes a light indicator.

* * * * *